UNITED STATES PATENT OFFICE.

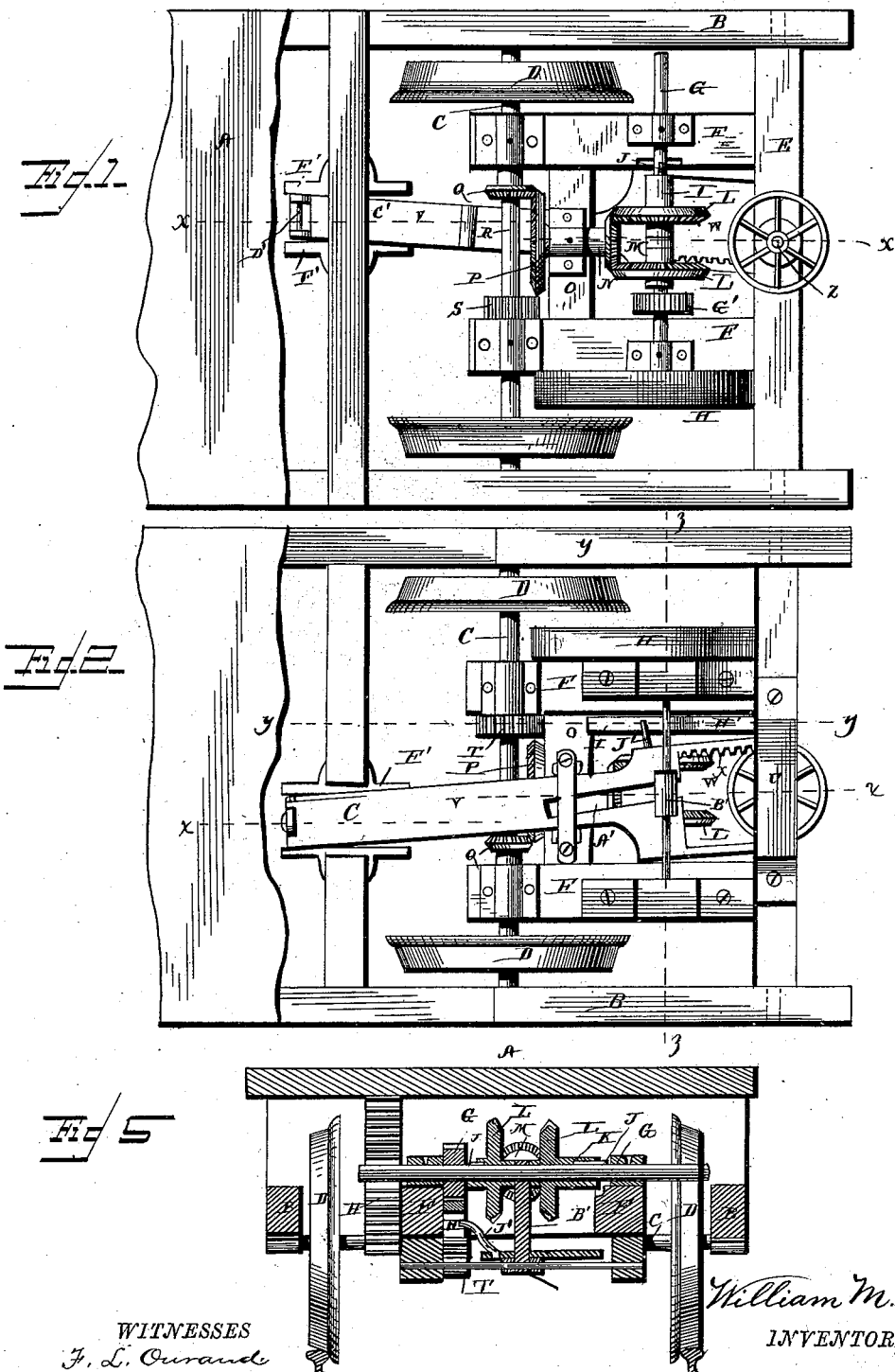

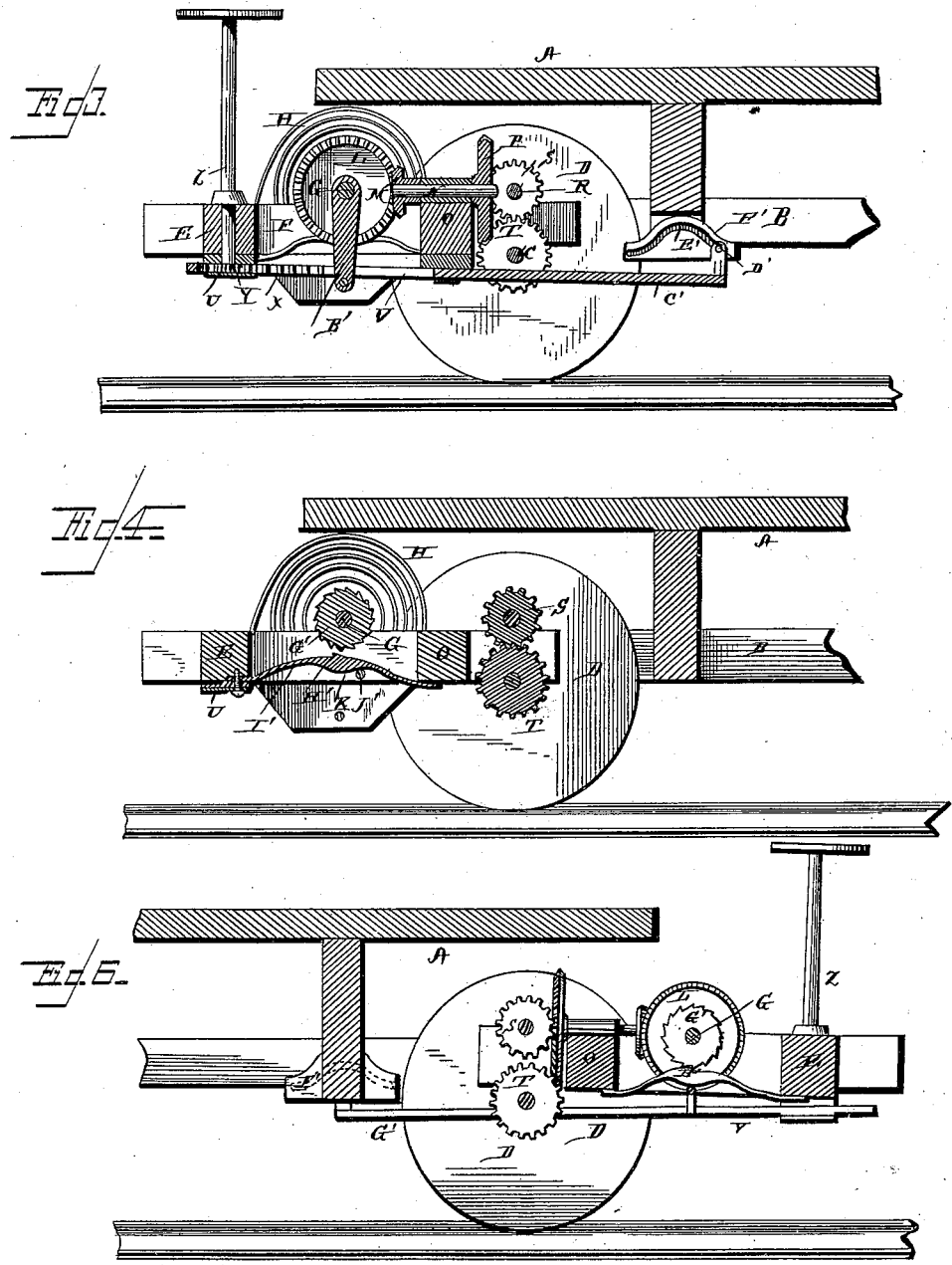

WILLIAM MARION CASS, OF CARLOCK, TENNESSEE.

CAR BRAKE AND STARTER.

SPECIFICATION forming part of Letters Patent No. 333,109, dated December 29, 1885.

Application filed May 20, 1885. Serial No. 166,143. (No model.)

*To all whom it may concern:*

Be it known that I, WILLIAM M. CASS, a citizen of the United States, and a resident of Carlock, in the county of McMinn and State of Tennessee, have invented certain new and useful Improvements in Combined Brakes and Car-Starters; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view showing my invention applied to the truck of a railroad-car. Fig. 2 is a bottom view of the same. Fig. 3 is a longitudinal vertical sectional view taken on the line $x\,x$ in Figs. 1 and 2. Fig. 4 is a longitudinal vertical sectional view taken on the line $y\,y$ in Fig. 2. Fig. 5 is a vertical transverse sectional view taken on the line $z\,z$ in Fig. 2, and Fig. 6 is a longitudinal vertical sectional view showing the machine thrown out of gear.

The same letters refer to the same parts in all the figures.

This invention relates to an improved machine adapted to be attached to railroad-cars and to other vehicles of all kinds for the double purpose of acting as a brake, when required, and for the purpose of storing the power gained by the momentum in going downhill or in stopping the vehicle, to be applied in assisting the vehicle in traveling uphill, and to enable it to travel short distances without the assistance of other motive power.

The invention consists in the improvement, construction, and arrangement of parts composing the said machine, which will be hereinafter fully described, and particularly pointed out in the claims.

In the drawings hereto annexed, A designates the frame of an ordinary car-truck, of which B B designate the sides or sills, and C C the axles carrying the wheels D D. Between the projecting ends of the sills B B is pivoted a transverse beam or rock-shaft, E, forming the front end of a swinging frame, the sides of which are composed of the beams F F, the front ends of which are secured to the said beam or rock-shaft E. The upper sides of the side beams, F F, are provided near their front ends with bearings for the transverse shaft G, upon which one or more springs, H, are coiled, as shown, the inner ends of the said springs being attached to the said shaft, and their outer ends being suitably secured to the front frame beam, E, so that by the revolution of the shaft G the said springs may be wound upon the latter. The transverse shaft G is provided with a laterally-sliding sleeve, I, connected therewith, so as to revolve therewith, by means of a groove and feather, J K. The said sleeve carries a pair of bevel-gears, L L, facing each other, as shown, so that by moving the carrying-sleeve laterally either one of the said bevel-wheels may be caused to engage a pinion, M, mounted upon the front end of a longitudinal shaft, N, journaled in suitable bearings upon a cross-piece, O, connecting the side frame pieces, F F. The rear end of the said longitudinal shaft carries a bevel-gear, P, meshing with a pinion, Q, upon a transverse shaft, R, mounted upon the frame-pieces F F, as shown. The shaft R carries a pinion, S, meshing with a pinion, T, upon the front axle C, so that by the revolution of the latter the said shaft shall be revolved, or vice versa, according to the direction in which the vehicle travels, and which one of the bevel-gears L engages the pinion M. It will thus be seen that the rotary motion of the axle will either cause the spring or springs H to be wound upon the shaft G, or it will be caused by the unwinding of the said springs from the said shaft, as the case may be. The under side of the beam or rock-shaft E is provided with a yoke or bail, U, in which is mounted a longitudinally-sliding frame, V, the front end of which is provided with a slot, W, one side of which has a rack, X, engaging a pinion, Y, mounted upon the lower end of a vertical shaft, Z, which is journaled in the said frame-piece E. The frame V is provided in rear of the slot W with a rearwardly-extending diagonal slot, A', through which passes a stem, B', the upper end of which is journaled upon the sleeve I, which latter, together with the bevel-gears mounted thereon, may be moved laterally by means of the said stem, when the latter is displaced laterally in either direction by the forward or backward movement of the frame V. The latter is provided with a rearwardly-extending stem, C', which slides in a suitably-arranged bracket upon the under side of the swinging frame, and the extreme rear end of which is provided with laterally-extending pins or friction-rollers, D', arranged to slide in cam-grooves E', in suitable bearing-plates, F', secured to the under side of the car-frame. The transverse shaft G carries a ratchet-wheel, G', which is adapted to engage a stud or dog, H', which is mounted upon a spring, I', secured to the swinging frame, as shown. When the machine is in its normal or operative position, the said stud or dog is out of gear, and it is only thrown into action by the motion in either a forward or rearward direction of the frame V, which is provided with a laterally-extending pin, J', adapted to press against a bulge, K', upon the under side of the said spring, which latter may thereby be forced in an upward direction, so as to cause the said stud to engage the said ratchet-wheel, and thereby check the revolution of the shaft G, which would otherwise ensue by the unwinding of the spring or springs mounted thereon.

The operation of this invention will be readily understood from the foregoing description, taken in connection with the drawings hereto annexed. It will be seen that when the frame V is stationed centrally between the points to which it may be moved longitudinally, the shaft G is thrown out of gear, and the unwinding of the spring or springs is prevented. By moving the said frame V to either end the said shaft G may be caused to revolve in either direction with relation to the car or vehicle axles. It will be seen, therefore, that adjustment may be made so as to cause the spring or springs to be wound upon the said shaft G, the motion of the car or vehicle being checked or braked by the force required for this purpose. When the spring or springs have been sufficiently wound, the shaft G may be thrown out of gear, and the power stored in the springs may be applied whenever desired by moving the frame V in the opposite direction for the purpose of giving additional impetus to the car or vehicle in the manner and for the purposes set forth.

The power stored by the action of my invention may be applied to many purposes besides that of starting or driving the vehicle to which it is applied—for instance, for the purpose of driving light machinery—by simply disconnecting the power from the vehicle and applying it in any suitable manner to the machinery to be driven. I would also state that in the case of vehicles which are not provided with revolving axles, as is the case with many road-vehicles, the connection of the pinions S upon the shaft R is to be made with pinions T, suitably constructed or mounted upon the hubs of the front wheels of such vehicle.

Having thus described my invention, I claim and desire to secure by Letters Patent of the United States—

1. In a combined vehicle brake and starter or power-storage machine, the combination, with a vehicle-body, of a swing or oscillating frame, a shaft mounted in the said frame and having one or more springs adapted to be wound thereon, a sleeve arranged to slide laterally upon the said shaft and having a pair of bevel-gears facing each other, a stationary shaft having a pinion adapted to engage either one of the said bevel-gears, and a miter-gear meshing with a pinion upon a transverse shaft, a pinion upon the latter shaft adapted to engage a pinion upon one of the car or vehicle axles, and means, substantially as described, for manipulating the said oscillating frame, substantially as and for the purpose set forth.

2. In a combined vehicle brake and starter or power-storage machine, the combination, with the vehicle-body, of a swinging or oscillating frame having a transverse shaft equipped with one or more springs adapted to be wound thereon, a train of gears adapted to connect the said shaft with one of the vehicle-axles, a ratchet-wheel upon the said shaft, a stud or dog mounted upon a spring and adapted to engage the said ratchet-wheel, and a longitudinally sliding and vibrating frame connected with and adapted to operate the oscillating frame, and having a laterally-extending pin adapted to engage and operate the spring carrying the stop stud or dog, substantially as herein described, for the purpose set forth.

In testimony that I claim the foregoing as my own I have hereunto affixed my signature in presence of two witnesses.

WILLIAM MARION CASS.

Witnesses:
J. W. LUSK,
J. E. SLACK.